C. W. HALL.
LAWN EDGER.
APPLICATION FILED SEPT. 11, 1914.
1,179,178. Patented Apr. 11, 1916.
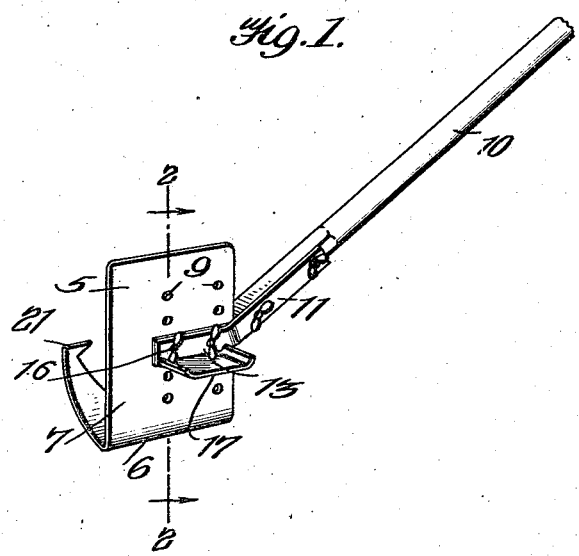
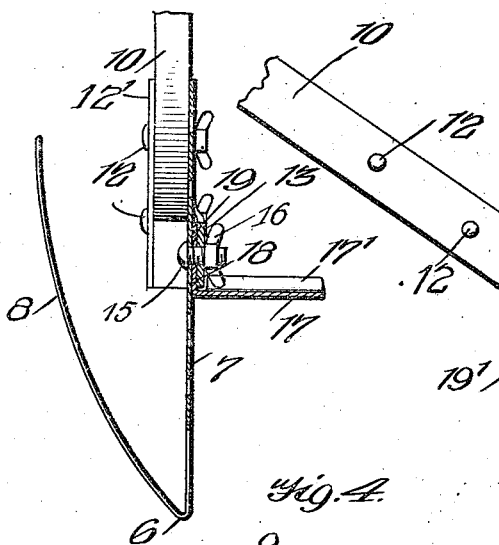
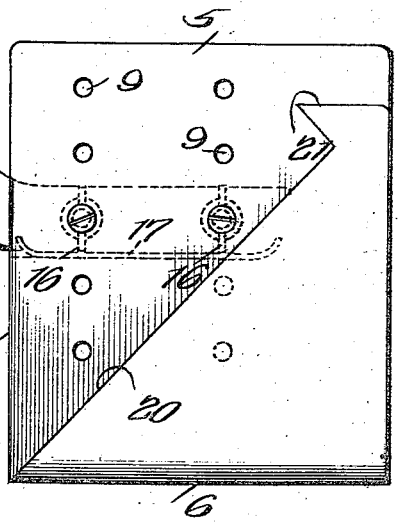
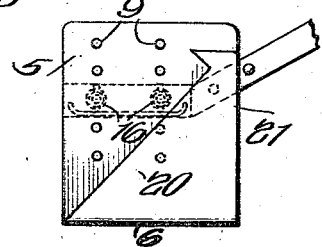
WITNESSES
INVENTOR
CARL W. HALL,
BY Munn & Co.
ATTORNEYS

UNITED STATES PATENT OFFICE.

CARL WATKINS HALL, OF DENVER, COLORADO.

LAWN-EDGER.

1,179,178.          Specification of Letters Patent.          Patented Apr. 11, 1916.

Application filed September 11, 1914. Serial No. 861,198.

*To all whom it may concern:*

Be it known that I, CARL W. HALL, a citizen of the United States, and a resident of Denver, in the county of Denver and State of Colorado, have made certain new and useful Improvements in Lawn-Edgers, of which the following is a specification.

My invention is an improvement in that class of lawn-edgers and -trimmers which consist, broadly stated, of a curved blade secured to a handle and provided on one side with a lateral gage which runs on the curb or edge of sidewalk, and is adjustable vertically to vary the depth of cut made by the blade.

The invention is hereinafter described with particular reference to the features of novelty.

In the drawings accompanying this specification and forming a part thereof, the preferred embodiment of my invention is illustrated, in which:—

Figure 1 is a perspective view of the lawn trimmer arranged to cut or trim the right side of a lawn taken with respect to the operator's position as a reference, Fig. 2 is a cross sectional view taken on the line 2—2 of Fig. 1, Fig. 3 is a view in side elevation of the foregoing, Fig. 4 is a view in side elevation similar to Fig. 3 but with the handle reversed and in position for cutting the left edge or side of a lawn.

Referring to the drawings in which similar reference numerals designate corresponding parts throughout the several views, a blade 5 is bent along a transverse line 6 so as to define the vertical portion 7 and the laterally extending portion 8 projecting therefrom. The vertical portion of the blade has two vertical rows of apertures 9, providing for the securement of the handle 10 thereto and its vertical adjustment thereon. The handle 10 is formed of wood or some allied suitable material and has the angle shaped bar 11 secured to its lower extremity by the bolts 12 the heads of which bear against the handle reinforcing strip 12'. The horizontally projecting arm 13 of the angle bar is provided with the spaced apertures corresponding to and adapted to register with the apertures 9 providing for the insertion of the holding bolts 15 therethrough, which latter are securely locked thereto by the thumb nuts 16.

A gage or rest plate 17 is provided with the upturned forward and rear edges 17' and with the angularly disposed bracket 18 through which the apertures 19 extend. The apertures 19 register with the apertures 14 of the horizontal arm of the supporting bar, and receive the holding bolts 15 therethrough. The upstanding bracket 18 is interposed between the arm 13 of the handle supporting bar and the vertical portion 7 of the blade and is securely held so positioned.

The front edge 19' of the vertical portion of the blade is sharpened, as is also the upwardly and rearwardly inclined edge 20 of the laterally extending portion. In this connection it is to be noted that the laterally extending portion of the blade is arcuate in cross section, as illustrated in Fig. 2 to facilitate and enhance the cutting action of the implement. The uppermost extremity of the laterally extending portion of the blade is provided with a curved, notched or hook-shaped tooth 21 the function of which is to insure a clean cut to the top of the blade. Without the notch or hook-shape, especially in cutting new trenches, tough roots, sod or entangling weeds or vines would slide over the cutting edge and not be severed; whereas by the provision of the notch or hook it will either cut or pull them out, so as to make a clean trench in any case.

The handle 10 being secured to one side of the angle supporting bar 11 allows the bar to be reversed with respect to the front edge of the blade and, instead of projecting in front of the front edge of the blade, as illustrated in Fig. 1, may project to the rear thereof, as illustrated in Fig. 4. The gage or rest plate remains in its fixed position during the reversing of the handle and is adapted to rest upon a walk, and so determines the depth of cut. With the handle in position as illustrated in Fig. 1 the implement will be used similar to a hoe or allied tool in which a drawing action is relied upon for the implement's operation. With the handle reversed, as illustrated in Fig. 4, the implement will be pushed ahead of the operator, as will be readily appreciated.

The rear edges of the blade may also be sharpened and capable of cutting and trimming the edge of a lawn should the occasion arise which would so warrant. The blade may be bent into other forms than those shown on Fig. 2 should it be so required, but the preferable form is disclosed in said figure.

Having thus fully described my invention, what is claimed is:—

1. The improved lawn edger or trimmer comprising a V-shaped blade having vertical rows of apertures in its body portion, a bent handle applied to one side of the body, an angular gage plate secured to the opposite side, bolts passing through these three parts and serving to secure them together adjustably so that the handle and gage may be adjusted vertically together upon the blade, and also be reversed in position, as described.

2. The improved lawn-edger or -trimmer including a V-shaped blade whose vertical front edge and laterally projecting side edge are sharpened, the lateral portion being inclined rearward and its upper rear corner constructed integrally in hook form and opening toward the front, as shown and described.

CARL WATKINS HALL.

Witnesses:
HUGH G. TAYLOR,
CHAS. B. RUMSEY.